United States Patent
Bennett

(10) Patent No.: US 8,055,671 B2
(45) Date of Patent: *Nov. 8, 2011

(54) SEARCH ENGINE USING WORLD MAP WITH WHOIS DATABASE SEARCH RESTRICTION

(75) Inventor: James D. Bennett, Hroznetin (CZ)

(73) Assignee: Enpulz, LLC, Chicago, IL (US)

( * ) Notice: Subject to any disclaimer, the term of this patent is extended or adjusted under 35 U.S.C. 154(b) by 414 days.

This patent is subject to a terminal disclaimer.

(21) Appl. No.: 11/847,094

(22) Filed: Aug. 29, 2007

(65) Prior Publication Data

US 2009/0063451 A1   Mar. 5, 2009

(51) Int. Cl.
*G06F 17/30* (2006.01)
(52) U.S. Cl. ........................ 707/765; 707/766
(58) Field of Classification Search .................. None
See application file for complete search history.

(56) References Cited

U.S. PATENT DOCUMENTS

| | | | | |
|---|---|---|---|---|
| 7,624,101 B2 * | 11/2009 | Lin et al. | ................................ | 1/1 |
| 2002/0027567 A1 * | 3/2002 | Niamir | .......................... | 345/738 |
| 2002/0091923 A1 * | 7/2002 | Chipman et al. | ............... | 713/168 |
| 2002/0161757 A1 * | 10/2002 | Mock et al. | ........................ | 707/5 |
| 2003/0158839 A1 * | 8/2003 | Faybishenko et al. | ............ | 707/3 |
| 2004/0064334 A1 * | 4/2004 | Nye | ................................... | 705/1 |
| 2006/0218303 A1 * | 9/2006 | Adelman et al. | ............... | 709/245 |
| 2007/0214284 A1 * | 9/2007 | King et al. | ..................... | 709/245 |
| 2007/0233780 A1 * | 10/2007 | Shevlin et al. | ................ | 709/203 |

* cited by examiner

*Primary Examiner* — Shyue Jiunn Hwa
(74) *Attorney, Agent, or Firm* — Garlick Harrison & Markison; Bruce E. Garlick

(57) ABSTRACT

In most of the Internet search operations, unwanted search results can be eliminated to reduce the high volume of the Internet traffic, and make the search operation highly efficient, according to the present invention. The present invention proposes a two step approach. The first step is to achieve the high relevance of the search results by search region restricted search operation. The second step, further adds high degree of relevance to the search results by the contact address correlation with a reliable reference address or the legitimate contact address eliminating the spurious and unwanted sites from the search result list. The region restricted search does searching in a selected geographical region. Thus the region restricted search operation minimizes the search time and huge volume of Internet traffic, which is likely to impair the overall Internet performance.

13 Claims, 10 Drawing Sheets

SEARCH ENGINE USING WORLD MAP WITH WHOIS DATABASE SEARCH RESTRICTION

BACKGROUND

1. Technical Field

The present invention relates generally to Internet searches and more specifically to geographical information based search restrictions.

2. Related Art

Searching for information on the Internet is a very common activity that requires the use of a browser capable of retrieving information from a website. In such an operation, a search website is accessed and search terms provided by a user by typing in search terms in a free form text format. A search engine receives the search terms and retrieves results. During most of the search operations that are performed using current search engines, geographical information is not used as part of the search. Therefore, search results are returned that include information on products and/or services that may be available only half way around the world, which are not very useful to a user. People desiring to locate a store or a service using the search engine typically want to find results relating to products and services that are geographically proximate. However, most information produced by the search is devoid of information regarding "proximity" to a user.

To address this problem, some search engine produce maps that directly show locations of businesses having web pages produced by the search. Often times, though, a large list of search results are generated and displayed on a map on the client device's screen resulting in a map that is cluttered with markers corresponding to the search results. Further, the businesses identified on the map may only be partially relevant to the search. In the few map based search engines that are currently available, there is no means to control the items that show up in a search list in terms of the proximity to the user's current location. There are no means to facilitate control on the arbitrary size of the search region by which a user can systematically partition a large search area on the map and do the search operations, systematically on the world map.

With current search engines, a search region may be selectable only to a certain extent for a predefined area or a location such a city, a state, or a country, for example. Often search results identify service providers or stores that do not really exist in the region where they are purported to conduct business. Often, when searching for stores in a city, business and web pages show up during a search that are thousands of miles away from the city of interest.

Online maps often provide zooming functionality. User's areas of interest may be zoomed to a possible extent and the details of locations for businesses can be selected and visualized. If the area or the location of the map is too large and also, if the user is not aware of the topography of the area, it will be very difficult or confusing to zoom on a particular street and pick a desired business firm's premises. In other words it becomes difficult for the user to pick exactly a small location from a predefined large area or location. In this process, the location a user is searching for cannot be resolved properly to select the required ones, mostly when there is a lot of clutter within a small search region of the world map.

In a search operation using current search engines, the user has no control, or at best, a limited control, of the search result output for a given search string. The search results presented to the user is in the order of the relevance of the webpage to a user entered search string or on the basis of the popularity of the website. This criterion built into the current search engines are not always the best ones. For example, if a user is looking for a restaurant in a nearby place, the search results are provided in a distance-wise order of the physical address of the restaurant from the current location of the user. Often the restaurants located are not related to the user's location, or are located elsewhere but still show up in the search results.

There are huge number of Internet squatters and scammer who try to push their business illegally on the Internet. Their web links get indexed by search engines as are other legal and authentic websites and are produced during the search, confusing or misleading the user into picking an appropriate search item from the search result list. Current search engine have no effective algorithms or techniques built-in, that can either warn or block sites that are related to Internet squatters and scammers. Because of this shortcoming, the Internet has become a haven for illegitimate businesses and scammers. Resultantly, legal and authentic businesses lose their business to scam artists. Current search engines fail to test and block unauthorized or illegal businesses. Search engines simply have no control of Internet squatters and scammers.

Current search engines do not have any built-in techniques that can determine the current GPS (Global Positioning System) location of the user and mark it on the world map, or use it for searches. In that case, user often has no clue on his current location in an unknown remote city, and can guess at best. Therefore it is hard to find, for e.g. a coffee shop, even though he is able to find some coffee shops that show up on his laptop during a search. This is due to a lack of an ability to incorporate GPS coordinates (longitude and latitude in angle) in searches, which is a serious drawback.

Many current search engines generate redundant search results, which appear as search results simply because they are relevant to the search string. In some cases users are interested in performing a search based upon the correlation of a search string with titles of sought web pages, not on the basis of correlation of the search string with web page content. Because most search engines correlate search strings to all content of searched web pages, most of the search results are unusable or irrelevant because relevant web pages do not appear high in the search results. Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
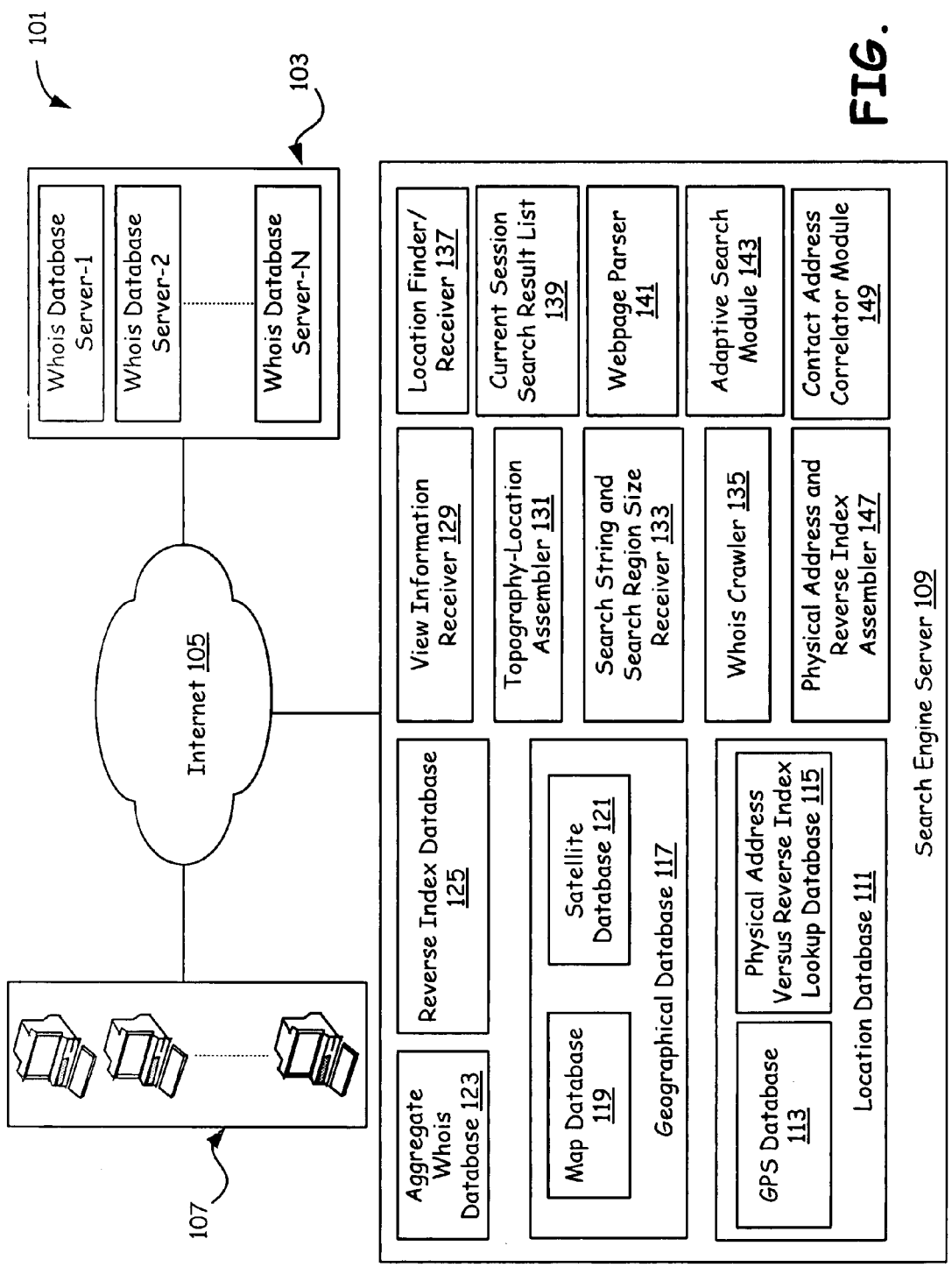
FIG. 1 is a block diagram of a network that facilitates searching on the Internet with a map based searching technique accompanied by search region restriction and a Whois data based verification of legitimacy of search results.

FIG. 1 is a perspective block diagram of a network that supports map based searching of documents that incorporates a search engine server capable of enforcing map based search restrictions and a Whois database server that provides details of location and ownership of websites on the Internet. The present invention deals with a mechanism in which, by pre-processing of the user input information, a dramatic reduction in the unwanted and unsolicited webpage traffic is achieved during a search operation. The reduction in the volume of the search results arising from spurious and fake sites encountered during a search operation is effectively implemented as a two step approach, in accordance with the present invention, first by an default search region (size) restriction, and second by filtering the spurious and unwanted sites by a method of address correlation. The term spurious and unwanted sites refers to Internet squatters, scammers, and other illegal and dangerous sites and those that add very little value for searches on the Internet in the context of the present invention.

One approach normally followed to contextualize the search operation in the current search engines is by categorizing the search items at several levels making the search contextual, as far as possible. Business related searches are further contextualized by geographical search restrictions. The search restrictions implemented in some embodiments of the search engines are based on the geographic location with associated default region restrictions (such as 10 miles around a city center). However, city sizes and areas covered by a city are not well defined, and cities, are not uniform in size. This makes the specification of search region restrictions complicated, for e.g. if a search is made in two different cities with fairly large difference in their size, the number of hits will likely vary considerably. The current invention facilitates user defined search regions of arbitrary size and shapes for additional flexibility in restricting search results to those associated with geographical regions of interest.

A first step is employed to reduce the search results from regions of limited interest to a user, search results from such regions are eliminated based on a user specified region restriction criteria (or a default one if one is needed). Thus the search region is restricted based on the user's choice. The main features of user defined search region are its greater flexibility, so that the users can define their own search region with convenient shape and size, with a convenient search center i.e. the center of the search region with GPS (Global Positioning System) coordinates. A User can interactively alter the search region and relocate its center and do the search iteratively till he finds the search objects of his choice, within some convenient distance from his current location. The flexibility of changing the search region size and location makes the life of the mobile community, more comfortable.

A second step is employed to prevent the useless and misleading websites from contaminating the search results. In accordance with this principle, embodiments(s) of the present invention (in addition to the search efficiency achieved by search region restriction), implement post processing of the search result, based on address correlation. Firstly, when the search is performed for a given search string, web links corresponding to that search string and for the specified search region are gathered together. Secondly, the legitimacy of the web links that are selected is tested. The legitimacy testing is done with respect to the contact address of the business firm retrieved from their web links from the (reverse index) database and web pages. In order to do this, a reference address (database) is derived from an aggregate Whois database that is available. This reference address is considered as the "legitimate contact address" herein. The other record of the address for the same business firm is from the searched webpage itself, and is called as the "webpage based contact address" herein.

When a web link points to a webpage, the webpage legitimacy is first tested before it gets presented to a user. One of the addresses in this address correlation process is a contact address (physical address) of a business or firm retrieved from a webpage included in a preliminary search result from a search conducted for a webpage. In one embodiment, a "webpage parser" component of the search engine server parses the webpage and extracts the contact address from it, and saves it (as "webpage based contact address") for a subsequent comparison. A "legitimate contact address parser" of the "physical address and reverse index assembler module" (of the search engine server) extracts the required "legitimate contact address" for the purpose of the legitimacy proof of the searched item.

A "search crawler" is employed that develops the "reverse index database" having all the searchable string (items) properly indexed and providing a reference to the associated document or web page by means of a URL or other reference means. A "Whois crawler" is employed by a search engine server that crawls a plurality of "Whois databases" and develops an "aggregate Whois database". The legitimate contact address parser of the "physical address and reverse index assembler" module parses all the registered entity's address and associates them with the corresponding searchable items of the "reverse index database". In the process of conducting this operation, a new database called as "physical address versus reverse index lookup database" is generated. In some implementations, it is part of an aggregate Whois database or repository.

The "physical address versus reverse index lookup database", not only indexes a searchable string (or item) to a specific host machine for its webpage, it also points an unique physical address (same as its legitimate contact address, enrolled or registered in the Whois database) or GPS coordinate of the corresponding business firm to which that search result item corresponds to, on the world map.

As the illegal sites are likely to possess a "legitimate contact address" enrolled in the Whois database, but with their names existing in the "physical address versus reverse index lookup database" (because they too are crawled), they will neither show up on the search results nor on a search result map (such as a geographical world map), nor in the final search result list (presented in the side pane of the search engine window). This is because of zero or negligible address correlation determined by a "contact address correlator module" of the search engine.

Also, a single searchable string (comprising a product name or the particulars of an item being searched, etc.) is often associated with multiple web links pointing to different web servers and each of the web links often have a legitimate contact address being enrolled in the Whois database. But as the search region is restricted, only those addresses associated with that search string that exist in that specified geographic location (or the search region) will show up in the search list (restrictions on results that show up in a search result set), as well as on the world map (search region or search window), with other addresses, naturally filtered. This filtering happens because of negligible or zero spatial (or regional) correlation determined by a "reverse index belongs to search region computing module" of the "adaptive search module" of the search engine.

The term legitimacy of business firm refers to a status verified via an official registration on a domain-name servers (that are crawled during a search operation) and on a "Whois server" or a "Whois repository", which provides a verification service by maintaining a database of all the domain-name registered websites. In some prior search engines many illegal links shows up during a search operation. Sometimes this happens due to the redirecting of web links. For example, illegal web links or a proxy web link with no value added services can appear on a registered webpage. When the registered webpage gets crawled, automatically the illegal web links and the proxy web links also show up in the search result list. If a user's mouse clicks on those web links, they open their web pages like any legal web pages. If these illegal web links (that appear in the registered webpage) are directly entered in the address bar of a network browser, the webpage presented will not be same as that obtained during a mouse clicked and opened from a search result, often leading to an unknown or irrelevant web site, indicating that they are illegal or useless.

An "aggregate Whois database" that collects Whois data from one or more Whois servers or databases acts as a reference database for the legitimacy checks of a business or firm that shows up during a search operation from having its website hosted on a server. For example, such as aggregate Whois database has to be derived as an aggregate collection of all the registration (details or information) from different Whois databases existing in different part of the world. During the aggregation of information from one or more Whois databases, it is possible to cross check the information retrieved from more than one source, thereby making it possible to be more accurate in terms of contact details of all the registered business and firms.

A large number of Whois databases are maintained by different service providers on the Internet. A search engine module called a "Whois crawler" aggregates the contents of all the individual Whois databases in a suitable format, giving rise to the "aggregate Whois database" that acts like a repository accessible during a search operation. This database can be updated periodically by running the Whois crawler, to reflect the changes that occur from time to time.

Each of the Whois databases maintained by respective service providers that contribute to the information to the aggregate Whois database are in turn an aggregate collection of domain name registration details from "domain-name servers" (for example). The individual Whois database manages the registration process of a particular domain. For example, registrations for domains ending with .net, .com, .org, etc. may be managed by a domain-name server and be associated with a corresponding Whois database. Again a crawler or a similar module on a Whois server can assemble the registration details on all the domain-name servers and maintains it as a "Whois database", which is subsequently crawled by the Whois crawler in accordance with the present invention.

FIG. 1 is a block diagram of a network 101 that facilitates searching on the Internet with a map based searching technique accompanied by search region restriction and a Whois data based verification of legitimacy of search results. In particular, a world map based search engine server 109 with access to Whois data, such as from a Whois database, is able to enforce search region restriction, in accordance with the present invention. The network 101 comprises the search engine server 109, a plurality of Whois database servers 103, and a plurality of client devices 107 that are communicatively coupled via Internet 105.

The search engine server 109 has multiple databases such as a geographical database 117 and a location database 111. The geographical database 117 further comprises a database related to world map database 119, and a satellite database 121. The world map database 119 contains the world map data in the image form which can be viewed with different magnifications on the client device display, if required. The satellite database 121 contains the topography view of the satellite's earth surface picture.

The location database 111 of search engine server 109 has the information that can be overlaid with the world map to locate precisely the position on the world map. The GPS database 113 has GPS coordinates information of a large number of discrete points considered on the world map at the resolution sufficient to resolve smaller structures (for e.g. smaller buildings) on the earth's surface. The discrete points considered are on a rectangular grid of latitude and longitude seen on the world map. If the grid size is small it is easy to determine the location of a place precisely in terms of the GPS coordinates.

The "physical address versus reverse index lookup database" 115 of the location database 111, is the combination of the "reverse index database" 125 with the "legitimate contact address" extracted from the aggregate Whois database 123. In the process of combining/merging, every searchable string in the reverse index database 125 is associated with multiple web links (as needed) and each web link is associated with a "legitimate contact address" that is identified from one or more sources. Thus each web link has a unique geographical address on the globe, which is managed and tracked for updates. The extraction of the legitimate contact address from the aggregate Whois database 123 is done by a module called "legitimate contact address parser, which is described in detail in FIG. 4, which is a sub-module of "physical address and reverse index assembler 147 of FIG. 1.

Figure 4:
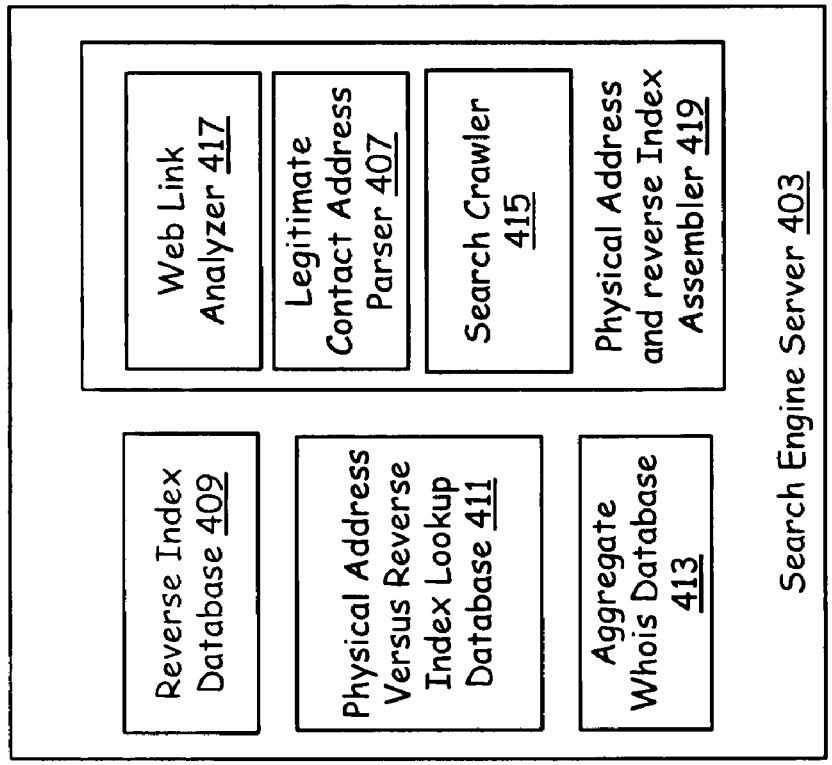
FIG. 4 is block diagram illustrating the generation of a "Physical address versus reverse index database" and "reverse index database" using the "Physical address and Reverse index assembler" module of the search engine server.

The reverse index database 125 is generated during the crawling operation performed by a search crawler 415 of FIG. 4 which is a sub-module of "physical address and reverse index assembler" 147 of FIG. 1. Not all the entries in the reverse index database are legitimate searchable items as there are items pertaining to the illegal websites. The physical address versus reverse index lookup database 115 is derivative of the "reverse index database" 125. The entries in the "physical address versus reverse index lookup database" 115 are augmented with the legitimate contact addresses derived by the "legitimate contact address parser" 407 of FIG. 4. The entries in the "physical address versus reverse index lookup database" 115 with the legitimate contact addresses are the legitimate websites with authentic registration, and rest are all squatters which are filtered during a search operation, in accordance with the embodiment of the present invention.

The sub-modules of "physical address and reverse index assembler" 147 of the search engine server 109 executes the function of generating the "physical address versus reverse index lookup database" 115. During a search operation if a webpage based contact address is determined to be not correlating with that located in the physical address versus reverse index lookup database 115 entries; those websites are automatically filtered from being presented to the user. The contact address correlator module 149 does the function of address correlation and filtering of squatters as explained later with the FIG. 7.

The adaptive search module 143 does the required mathematical operation for restricting searches to within the user specified search region. In one embodiment, the adaptive search module 143 performs this operation interactively with the user. The user can change the shape and size of the search region using dropdown menus and popup windows as explained later with FIG. 8. The search list that is presented to the user gets adapted with any changes/updates performed in the search region.

The Topography-location assembler 131 generates the views requested by the user by sending the request via view information receiver 129. Various databases are superimposed to generate the requested view on the client device's display. In one embodiment according to the present invention it is possible to know the location of the mobile user using a search engine server module called "location finder or receiver" 137. A button interface to the user from the search engine window facilitates the retrieval of his/her location on the world map in the user selected search region on the world map, in accordance with one embodiment in the present invention. If the user is connected to the Internet via WiFi or a third party wireless network the GPS location of the user can be derived by the received or transmitted signal processing. The location finder or receiver 137 retrieves the user location based on the IP number of the machine or device through which the user is connected to the Internet.

The "search string and search region size receiver" module 133 receives the user entered search string from the client device. According to the present invention the restricted search region shape and size can be provided to the search engine via the "search string and search region size receiver" module 133. The user selects the shape of the search domain such as a square, rectangle, circle, ellipse, etc., from a dropdown menu in the search engine window from the client device. Subsequently, a pop up window prompt user to enter, the dimensions of the search domain, such as the side of a square (L), length and width (L, and W) of the rectangle, radius (R) of the circle, major and minor axes ("a", and "b") of the ellipse, etc. Another option to specify the region restricted search operation is the complete World Wide Web, where the search is performed over the entire Internet. During an Internet search session, search results are generated and displayed on the client device screen. The "current session search result list" 139 is the search results generated for currently entered search string which are displayed on the client device.

Figure 2:
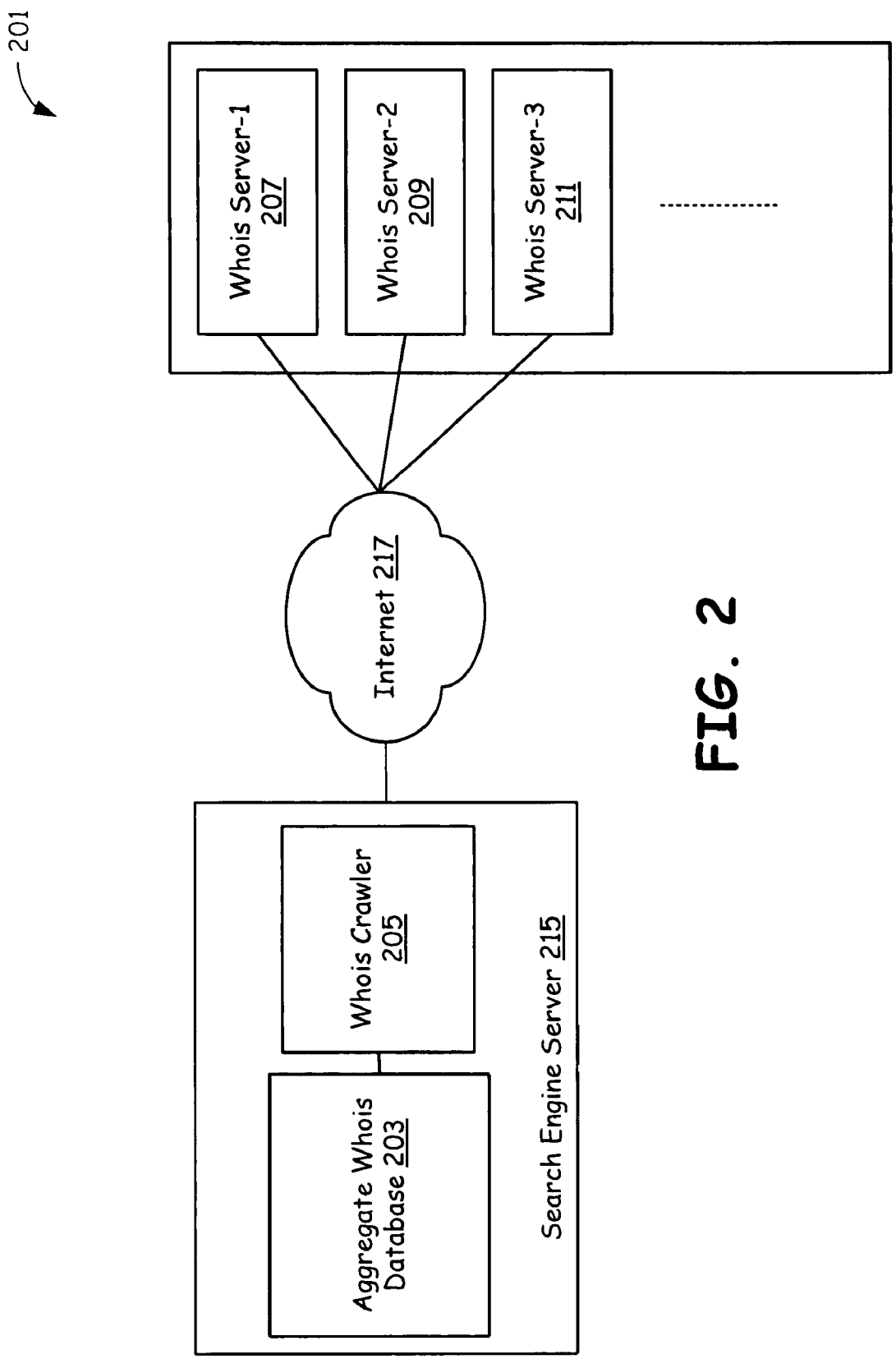
FIG. 2 is a block diagram illustrating the generation of an "aggregate Whois database" derived from a plurality of Whois databases maintained by different service providers, in accordance with the present invention.

FIG. 2 is a block diagram illustrating a system 201 for the generation of an "aggregate Whois database" derived from a plurality of Whois databases maintained by different service providers, in accordance with the present invention. There are typically a large number of Whois database servers generated and maintained by different service providers. Each one of these servers maybe located at different geographic locations. In order to use these distributed databases for the purpose of search operation it is essential to pool all the databases to get a single database called herein as an "aggregate Whois database".

The process of pooling the multiple databases and reformatting is done by a module called a "Whois crawler". The Whois crawler rearranges the pooled database items. The Whois crawler also extracts only the essential pieces of information that is required during an Internet search operation. The essential pieces of information extracted include all information essential to identify the nature of the business that a registered business firm is doing along with all the form of contact information.

In general, the generation of an "aggregate Whois database" involves retrieving Whois data from a plurality of Whois databases maintained by different service providers, and quite often the Whois databases are accessed via an associated Whois server. A plurality of the Whois servers 207, 209, 211, etc. are communicatively coupled to the search engine server 215 via the Internet 217 (105 of FIG. 1 repeated). The Whois crawler 205 crawls through all the existing Whois servers and gathers essential pieces of information to build an aggregate Whois database 203.

Figure 3:
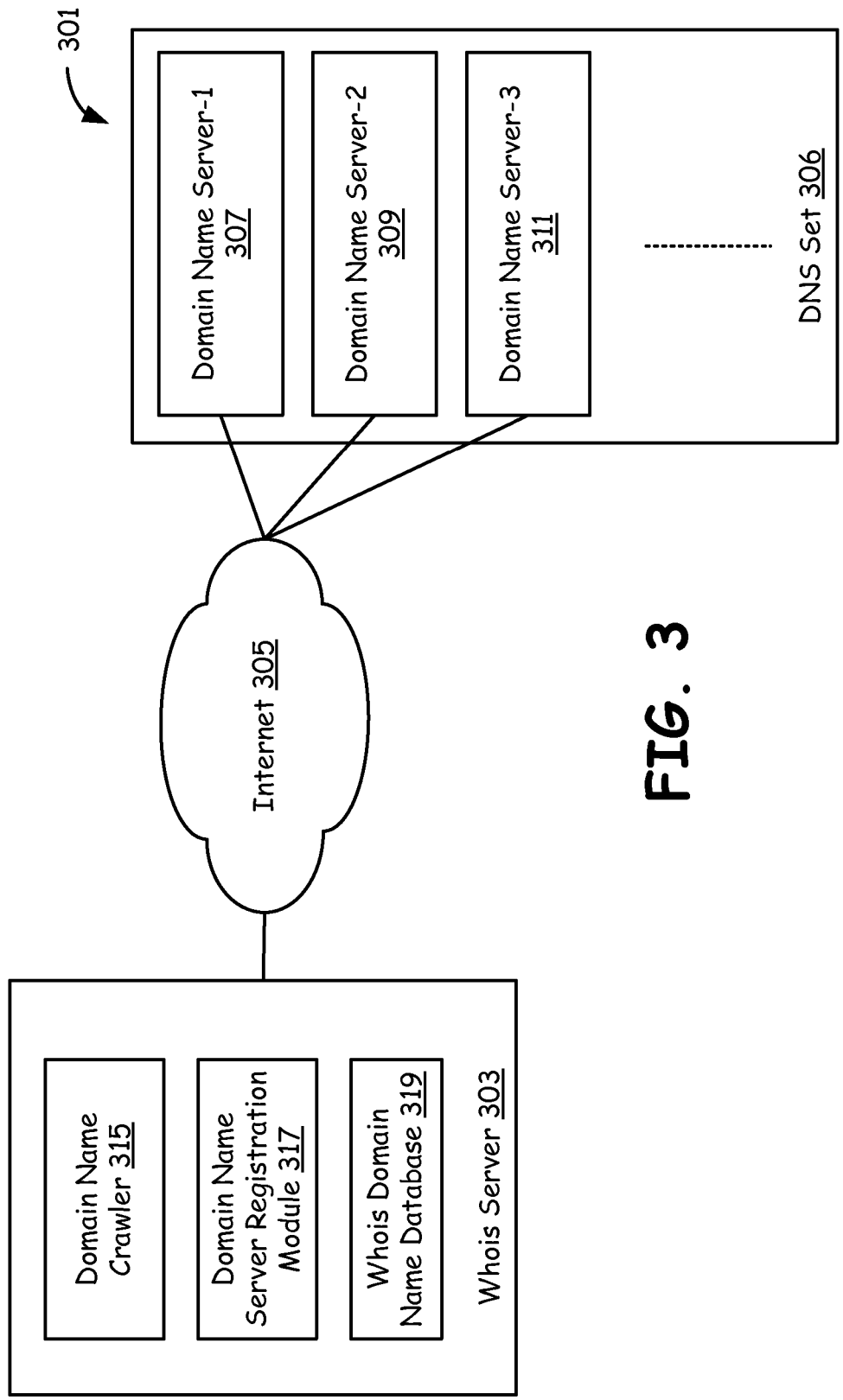
FIG. 3 is a block diagram illustrating a plurality of domain name servers communicatively coupled to a Whois server, wherein the Whois server monitors domain name registration and gathers relevant data, in accordance with the present invention.

FIG. 3 is a block diagram illustrating a system 301 having a plurality of domain name servers communicatively coupled to a Whois server, wherein the Whois server monitors domain name registration and gathers relevant data, in accordance with the present invention. There are web servers maintained by in different domains which get crawled during a search operation. All of the web servers are registered on their domain name servers, to whichever the domain they belong to. A "domain name crawler" 315 crawls through all the registration information from each of the "domain name servers" in the set 306, and builds a Whois database in an automated manner, which comprises the Whois domain name database 319, in accordance with one embodiment of the present invention. An automatically built/managed Whois database can be further reformatted manually to suit further / additional crawling processes that aid in the building of an "aggregate Whois database".

In general, a plurality of domain name servers 307, 309, 311, etc. is communicatively coupled with a Whois server 303 via the Internet 305 (105 of FIG. 1 repeated). A "domain name crawler" 315 from the Whois server 303 will crawl for all the registration information and details from each of the plurality of domain name servers 303, which includes the server 307, 309, 311, etc. The resultant database is the "Whois domain name" database 319. This topology automates the collection of Whois database information. The final Whois database will be crawled by a Whois crawler 135 of the search engine server 109 of FIG. 1, resulting in the aggregate Whois database 123 of FIG. 1.

FIG. 4 is block diagram illustrating a system 401 for the generation of a "Physical address versus reverse index database" and "reverse index database" using the "Physical address and Reverse index assembler" module of the search engine server. A normally generated "reverse index database" has links pointing to the web servers. It does not have any explicit or direct information on the geographical location of a business firm to which the webpage of the web link belongs to. An additional database is thus required which will augment the entries of the reverse index database with the legitimate contact address. The legitimate contact address is the output of a parsing of the "aggregate Whois database" record of a business firm. In one embodiment of the present invention the "search crawler" which builds the "reverse index database" is the part of the "physical address versus reverse index lookup database. The "search crawler" builds the "reverse index database". The Web link analyzer module associates the web links in the reverse index database entries with the corresponding "legitimate contact address" and generates the "physical address versus reverse index lookup database".

The search engine server 403 (109 of FIG. 1 repeated) manages the generation of a "Physical address versus reverse index database" 411 (115 of FIG. 1 repeated) and "reverse index database" 409 (125 of FIG. 1 repeated) using the "Physical address and Reverse index assembler 419 (147 of FIG. 1 repeated) module of the search engine server. The legitimate contact address parser 407 parses and extract the legitimate contact address from the aggregate Whois database records corresponding to the business search string that appears indexed in the reverse index database 409.

The "web link analyzer" module 417 associates the legitimate contact address with the web link of a searchable string (search string). An aggregate of augmented searchable string and web link entries gives rise to a new database called "physical address versus reverse index lookup database 411 (115 of FIG. 1 repeated). The entries in the "physical address versus reverse index lookup database" have all the necessary information for each of the entries such as a link that points to webpage and legitimate contact address that points to a unique geographical address or (GPS) coordinates of that business firm that has hosted its webpage on a web server. Aggregate Whois Database 413 (123 of FIG. 1 repeated) and Search Crawler 415 operate to support the other components of the system 401.

Figure 5:
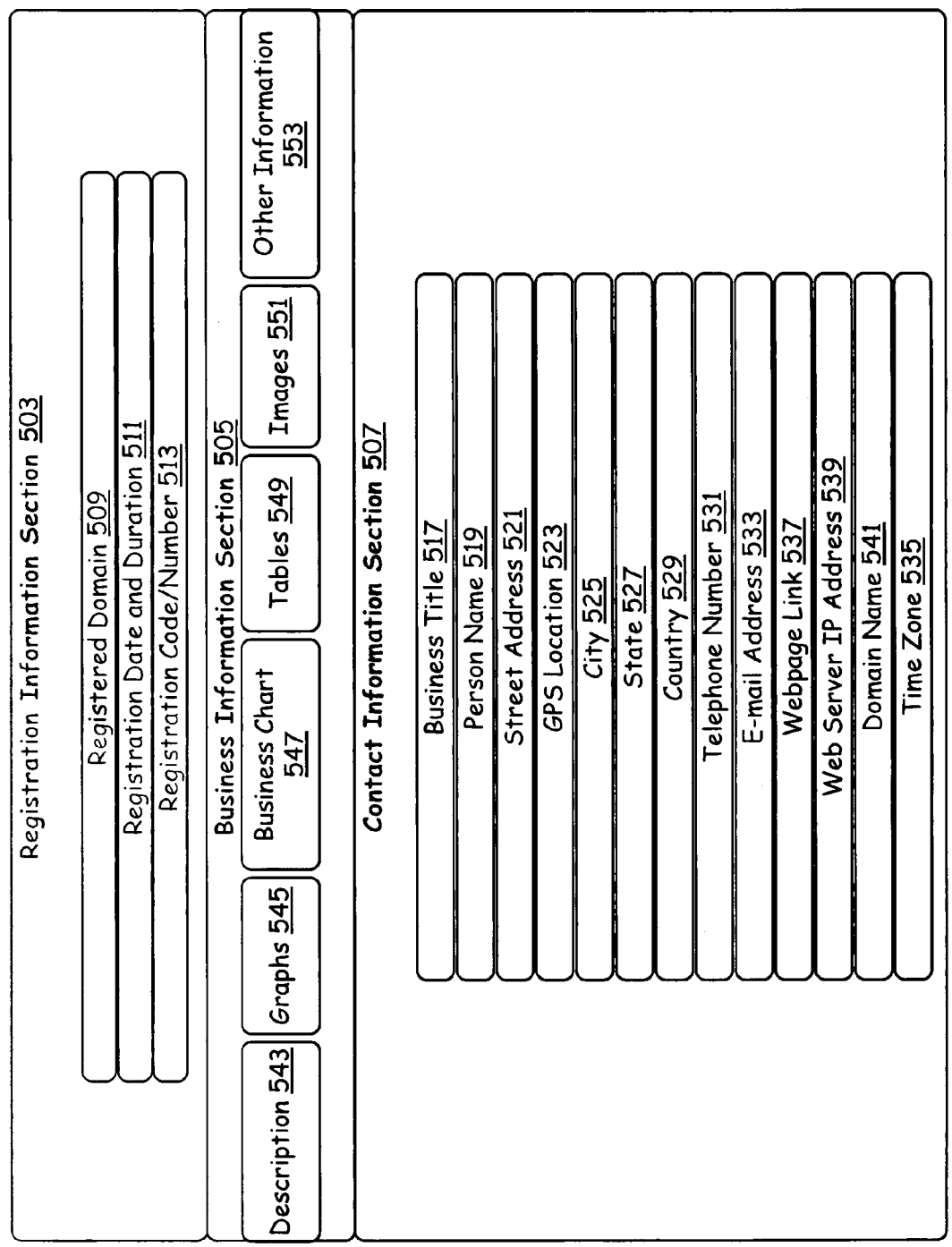
FIG. 5 is an exemplary set of registration information with associated formats collected from business registration information, such as those provided to domain registration servers and those maintained by a Whois database.

FIG. 5 is an exemplary set of registration information 501 with associated formats collected from business registration information, such as those provided to domain registration servers and those maintained by a Whois database. Such an exemplary set of registration information can be displayed, if necessary, in an output record viewed in a network browser window, in accordance with the present invention. The "legitimate contact address parser" associated with a search engine server extracts the fields in the contact information section provided by Whois databases or retrieved by a Whois crawler. In one embodiment of the present invention registration information will also be parsed and extracted to the record of aggregate Whois database, which will help in proving the registration authenticity of the business firm. A typical business information record contains a "registration information section", a "business information section", and a "contact information section".

The registration information section has all the business registration related information such as the domain name in which the website is registered and hosted, valid registration date, registration code/number, etc.

The Business information section contains complete description of the business which includes detailed textual description of the business, graphs, business charts, tables, images (of the products), etc.

The contact information section of the business registration information record contains all the information which helps in contacting a firm in all the possible forms. This includes the title of the business, person's name to contact, street address of the business firm, GPS location of the business's firm's premise, city, state, country, telephone number, e-mail address, time zone, web link (webpage), IP (Internet protocol) address of the web server, DNS (Domain Name Server) name of the web server, etc.

The typical content and associated format of business registration information record of a business firm, retrieved when it is searched on a Whois database, or viewed in a network browser window, in accordance with the present invention, provides several categories of information. The registration information section 503 has registration number domain name 509, valid registration date and duration 511, and registration code/number 513. The registration number is a unique number which identifies the registered firm uniquely in the Whois database. The registered domain name is the name of the Internet domain and type such as .net, .com, .org, etc. The registration duration is the period till the Whois database registration remains valid as per the subscription.

The business information section 505 has all the business details which a firm wishes to disclose publicly for promoting its business. The textual description 543 describes the nature of the business of the firm. Other pieces of information that a firm may wish to publicize are data in the form graphs 545 data in the form of business chart 547, data listed table 549, images 551 of the products, etc., and apart from these, are the other information 553.

The contact information section 507 contains all the information of contact details through which one can reach corresponding business firm and enquire related to their requirements. Business title 517 is a field which describes the name of the business firm as registered. Person name 519, the responsible person's name for e.g. spokesperson of the organization or the firm. Street address 521 is the physical or geographical address of the street and location of the firm. Global Positioning System (GPS) location 523 is a very essential and useful piece of the information on which the business firm premise is situated. The city 525 is the city in which the firm is located. State 527 and country 529 are the state and the country to which the firm belongs to, and situated in.

Telephone number 531 is another useful piece of information through which one can instantly reach the business firm and enquire on the business details. E-mail address 533 field of the contact information is used for written correspondence. Web link 537 is the URL (Universal Resource Locator) of the business firm. Web server IP address 539 is the identification of the server which hosts webpage of the business firm. The domain name 541 is the name of the web server on which the business firm's webpage is hosted on Internet. Time zone 535 field lets somebody know on the working office hours of the business firm.

Figure 6:
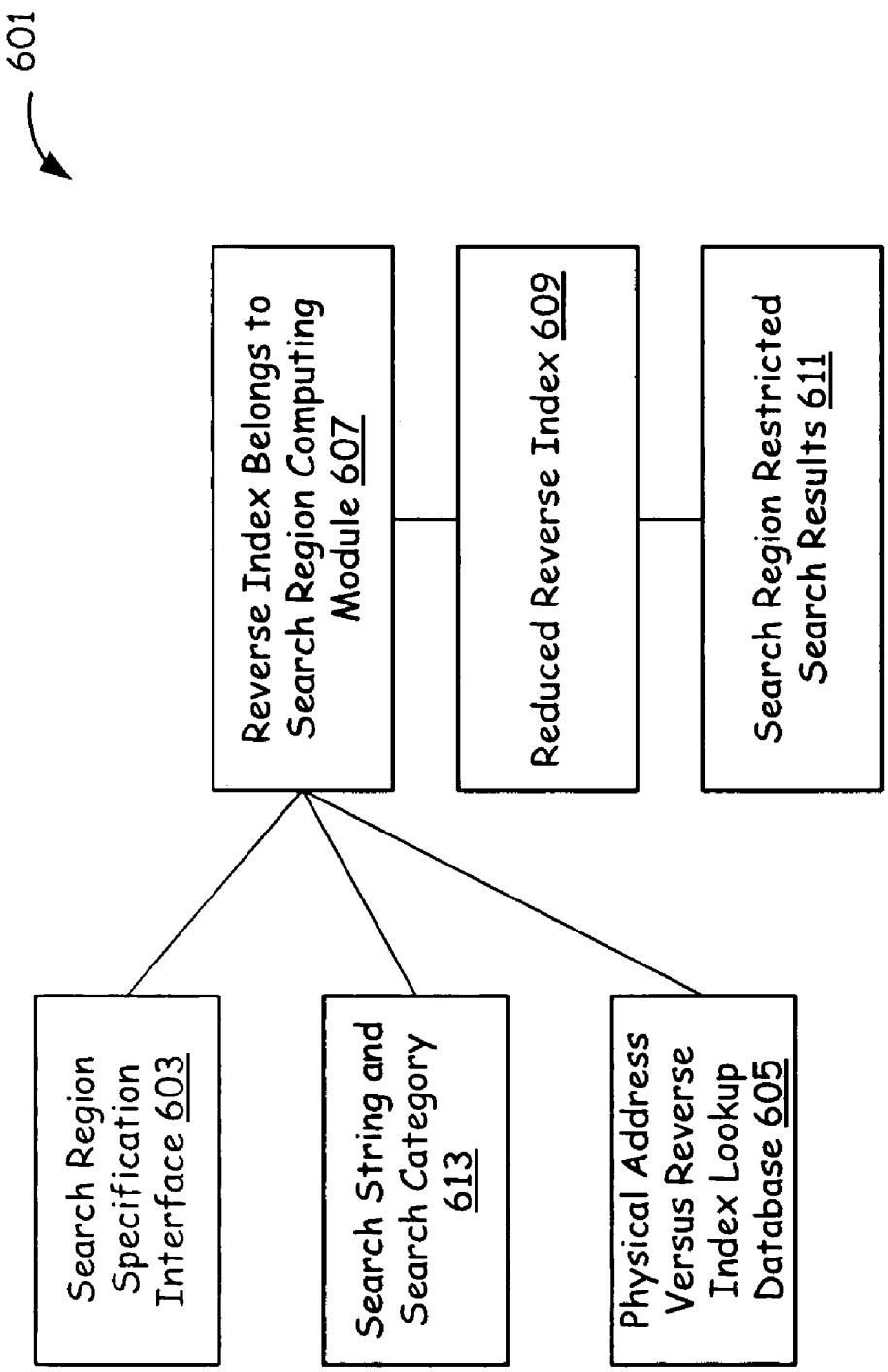
FIG. 6 is a block diagram illustrating the interaction of an "adaptive search module" of the search engine server for implementing search region restricted search operation, in accordance with the present invention.

FIG. 6 is a block diagram illustrating the interactions of an "adaptive search module" of the search engine server for implementing search region restricted search operation, in accordance with the present invention. The search region restriction facilitates contextual search operation. Unlike predefined search region restriction in the currently available search engines, the user defined search region restriction facilitates on-the-fly change of the search region, arbitrarily. Also as the user's interaction inputs are preprocessed during the search operation, a lot of junk search traffic is eliminated, in accordance with the present invention. When the search string and the region of the search is interactively provided by the user, only those results that fall in the search region are retrieved into the search list, thus avoiding unnecessary search.

A simple algorithm implements the intersection of the search region with the searched location addresses for a given search string all over the world, and finally results in a subset of the search results that fall within the specified searched region in the form of reduced reverse index. It is basically those legitimate contact addresses (Cartesian or GPS longitudinal and latitudinal, coordinates) of the searched business firms from within the search region that is of relevance. The algorithm checks whether an address belongs to the specified search region or not. If address belongs to it, that web link is retained in the search list otherwise not listed. To implement this algorithm we have three inputs viz. a search region specification interface with the user, search string and search category, and the "physical address versus reverse index lookup database". The entries in the "physical address versus reverse index lookup database" are basically grouped subsets of a search string, multiple web links with each web link associated with the corresponding legitimate contact address. The "reverse index belongs to search region" computing module picks only those entries in the database belonging to the search region, resulting in a "reduced reverse index" a subset for a given search, a small subset of the original database. The "reduced reverse index" database points to those websites in the specified search region.

The block diagram of FIG. 6 is illustrating the functionality 601 of an "adaptive search module" of the search engine server of the present invention. The search region specification interface 603 is the user interface from search engine window on the client device, an input to the "reverse index belongs to search region computing module" 607. The physical address versus reverse index lookup database is another input to 607. A third input to 607 is the user entered "search string and search category" 613.

The "reverse index belongs to the search region computing module 607 generates the "reduced reverse index 609, a subset of the 605. The web links corresponding to the entries in the "reduced reverse index" 609 constitutes the "search region restricted search results" 611 and are displayed on the world map within the search region on the client device from which the user performing the search operation.

Figure 7:
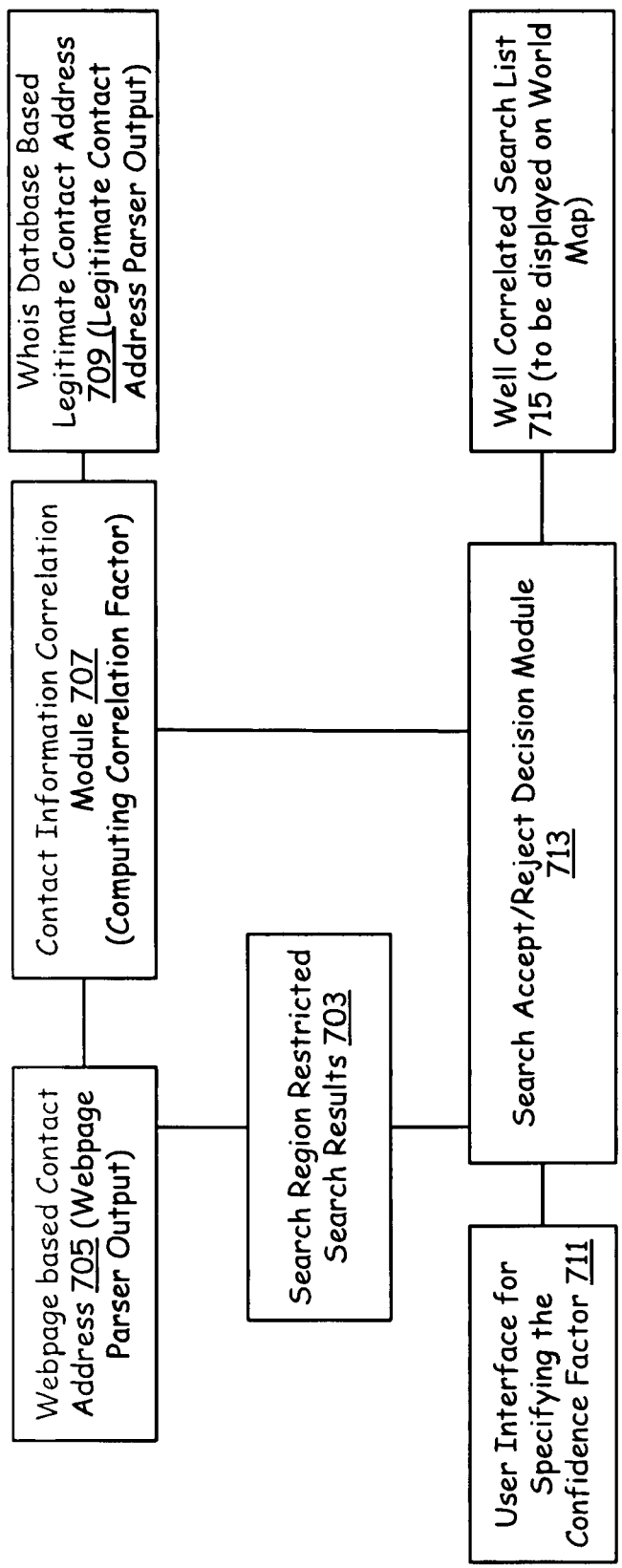
FIG. 7 is a flow chart illustrating an exemplary function of "contact address correlator module" of the search engine server of the present invention.

FIG. 7 is a flow chart illustrating an exemplary function 701 of "contact address correlator module" of the search engine server of the present invention. The principle of operation explained in this figure facilitates in checking, whether the selected web link in the search region for the currently entered search string is legitimate or not. The legitimacy of a web link is checked against its registration in the Whois database, (or the aggregate Whois database). The legitimacy is tested by comparing two pieces of address records, one derived from the webpage of the search item and the other derived from the aggregate Whois database. A "contact information correlation module" correlates the two address components and computes a correlation coefficient as its input.

The "search accept/reject decision module" decides whether the webpage/web-link can be retained in the 'search region restricted search list" or not. The decision is done against a user entered confidence level factor through an appropriate interface provided in accordance with this invention. Those correlation coefficient values which are greater than or equal to the confidence level factor are retained in the "search region restricted search result" list, others are removed generating a "well correlated search list" displayed on the world map.

The block diagram of FIG. 7 illustrates the function 701 of "contact address correlator module" of the search engine server of the present invention. The "search region restricted search results" 703 (611 of FIG. 6 repeated) is provided as input to the "webpage parser" 141 of FIG. 1, which extract and gives rise to a "webpage based contact address" 705. The webpage based contact address 705 acts as one input of the "contact information correlation module" 707. Another input to 707 is the "Whois database based legitimate contact address" 709. The "legitimate contact address" is the output of "legitimate contact address parser" 407 module of FIG. 4. The "contact information correlation module" 707 compares and computes the "correlation coefficient" between the webpage based contact address and the legitimate contact address.

A "search accept/reject decision module" 713 compares two inputs one from 707 and another from 711 a module for user interface for specifying the confidence level factor. During the comparison of two coefficients, those web links from the "search region restricted search results" 703 having correlation coefficient greater than or equal to user entered confidence factor from 711 are retained and others are filtered to generate a "well correlated search list" 715 (to displayed on the world map).

Figure 8:
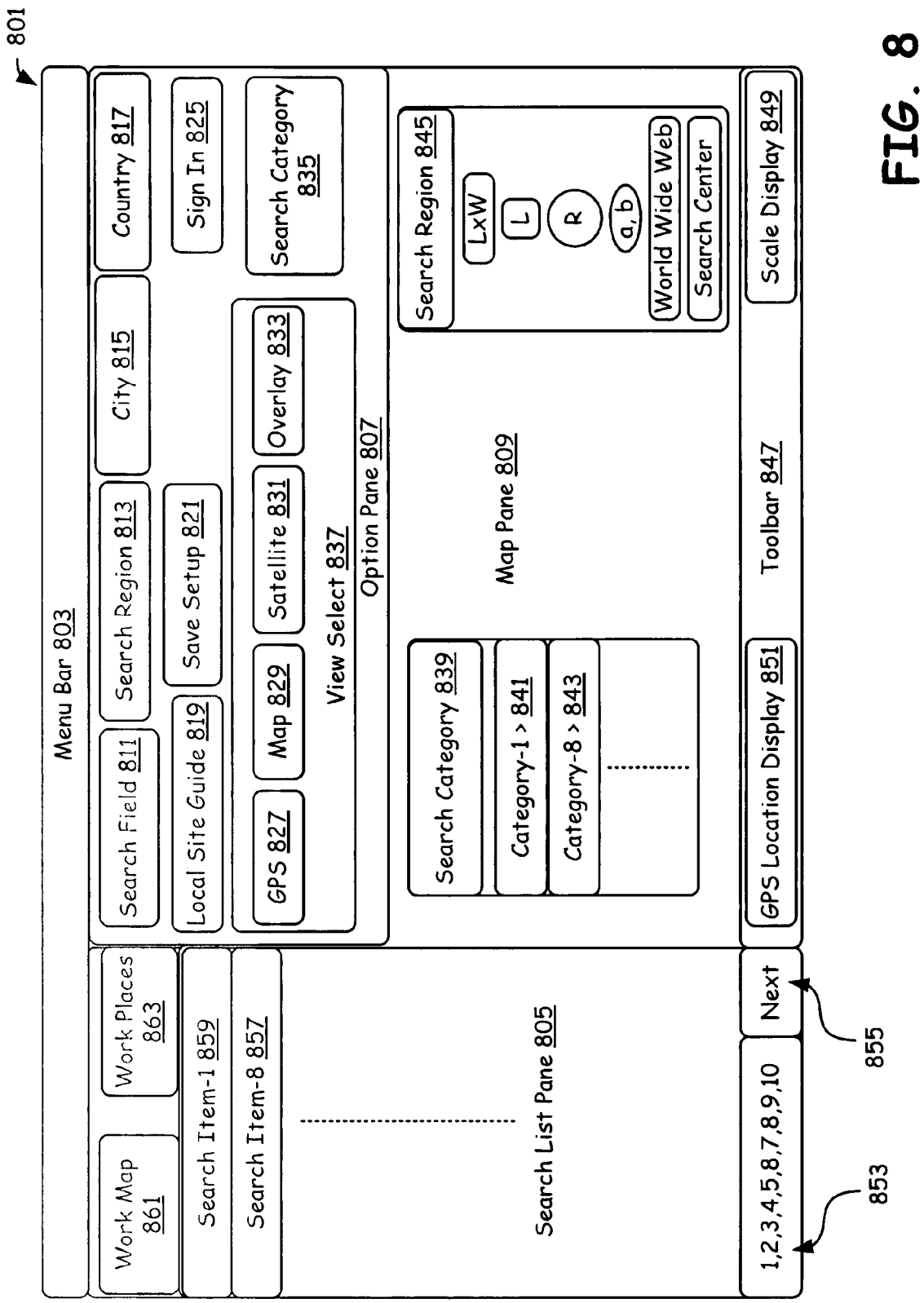
FIG. 8 is an exemplary screen snapshot of a world map based search operation supported by a search engine server, built in accordance with the present invention, that incorporates a Whois database based search region restricted search operation.

FIG. 8 is an exemplary screen snapshot 801 of a world map based search operation supported by a search engine server, built in accordance with the present invention, that incorporates a Whois database based search region restricted search operation. An option pane 807 helps a user in specifying options, for the view, search category, search region, etc. In a search list pane 805, the searched results are displayed in the text form as group of ten results for view. Next ten results can be viewed using the "Next" button provided in the same pane. A map pane 809 displays the selected view of the map (in the image format) along with the search results. Normally 10 search results can be conveniently displayed from the search list in the search list pane. In this pane user can also setup views and mark his own places and save them as his "work map" and "work places" for later reference. A menu bar 803 has all the general purpose menus available and the tool bar contains the tools for setting the right view on the map, along with the display such as GPS coordinates and the current scale of the map, etc.

The screen snapshot provided by the search region restricted search engine, in accordance with the present invention, makes it possible for a user to manage the search process in an efficient manner. The menu bar 803 contains all the menus commonly used in a network browser in which the search engine is opened. The search list pane 805 has all the search results listed in the order, as shown in the figure. The Search item-1 (859), search item-2 (857), etc. in the search list are ordered with a priority determined by an internal search criteria such as the frequency of the search string on the webpage, popularity of the webpage, etc., in accordance with one embodiment of the present invention. At the bottom of the search list pane 805 contains the search list groups 853 with numbers assigned. Each group typically has 10 web links in it. The number of web links in a group can also be set to a user defined number. The user can switch to the next group in the order by mouse clicking the "Next" button 855. The search list pane also includes some of the special buttons which facilitate user to personalize the search items for later references. The work map 861 button facilitates to store the map; normally the user uses this button to add markers on the locations of his interest on the map for a quick search, later.

Another important button is the work places 863 button, which facilitates the user to save his search results on the map to his favorites.

The option pane 807 enables the user to do settings of his choice on the map during the search session and also settings once done can be retrieved automatically during the later search sessions. The search field 811 is the place where the user enters his search string for the search operation. Further user enters the name of the city in the field 815, and the country in the field 817 if he wants to do search in some predefined locations on the map. User provides the search region for the restricted search region using the button 813, which results in popping up of a search region menu 845. From the search region menu user can select various search domain shapes such as a rectangle, square, circle, ellipse, World Wide Web, and search center. During this selection, again the user will be prompted to enter the dimensions of the search domains, such as length (L) and width (W) of the rectangle, sides of the square (L), radius (R) of the circle, major axis (a) and minor axis (b) of the ellipse, search center coordinates, etc.

The "sign in" button 825 enables a user to sign in for the subscribed services. Once signed in, the user has access to all his previously subscribed services with his work map, work places, etc., become accessible. From there he can pay and subscribe for the services or renew expiring services, etc. The user will also retrieve all his personalized work map 861 and work place 863 etc., saving from this location, once signed in. All the personalized setup can be saved after signing in, using the button save setup 821 for later retrieval.

The search can be categorized using the search category 835 button, upon mouse clicking this button results in popping up of a search category menu 839. Each of the search category items in the search category menu 839, such as category-1 (841), category-2 (843) etc., results in further sub menus, wherein the user can choose the subcategories; this makes the search more and more, context based. The search category list contains exhaustive list; also this can be further expanded depending on the emergence of new category (of business, etc.).

When the user does the restricted region search operation, for e.g. over a city; he can search for specific category of amenities in that location based on his needs. The local site guide button 819 facilitates this feature to the user to access the location amenities offered by some of the service providers registered in that location (or site).

The view select sub-pane 837 facilitates the user to select the world map view options, communicated to the search engine server 109 of the FIG. 1. If the user has mouse clicked GPS button 827, then the GPS location of the cursor point on the map will be shown in the bottom toolbar menu 847 on the GPS location display 851. The GPS coordinates are updated when the cursor moves from one location to next, and so on. The coordinates in terms of longitude and latitude of cursor point on the world map (view) are displayed on GPS location display 851, in the tool bar 847, in one embodiment according to the present invention. On one side of the toolbar 847, the world map display scale information 849 in all the zoomed-in and zoomed-out views will be displayed.

Choosing map 829 options from the view select sub-pane 837 displays only the bare map (with political boundary information). If user selects satellite view 831, the earth's satellite view will be superimposed on the world map. If user wants all the three view options viz., GPS 827, Map 829, and satellite 831 views to be superimposed, he can then select overlay button 833 by mouse clicking.

Figure 9:
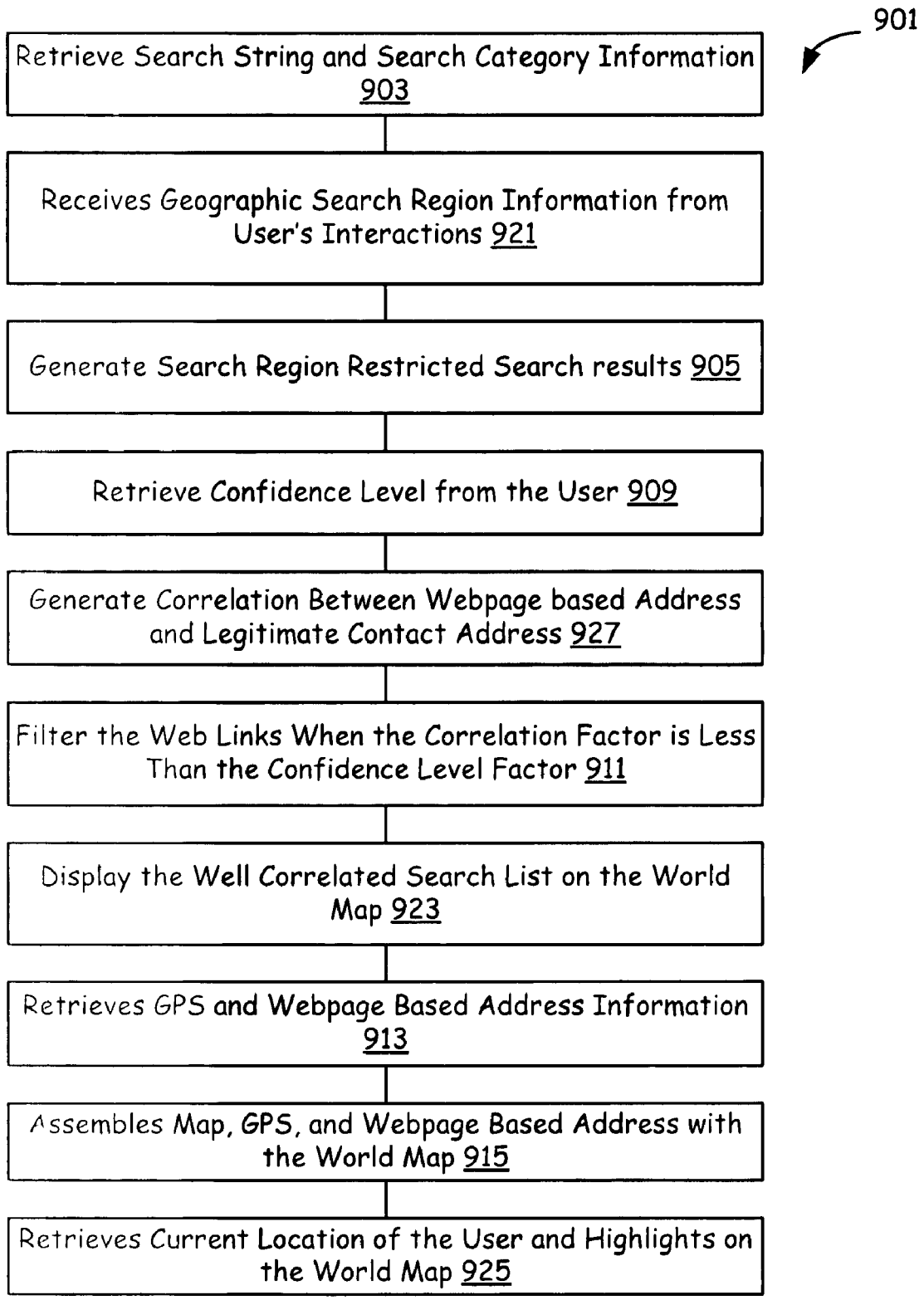
FIG. 9 is flowchart illustrating an exemplary operation of the search engine based on Whois database, in accordance with the present invention.

FIG. 9 is flowchart illustrating an exemplary operation 901 of the search engine based on Whois database, in accordance with the present invention. The method of operation 901 performed by the search engine begins at a block 903 with the retrieval of the search string, search category, and search region interactively from the user on a client device. Then, at a next block 921, the search engine generates search results from within a search region selected by the user, like a rectangle, a square, a circle, an ellipse, or World Wide Web, along with their dimensions. In the next block 905 a "search region restricted search results" 611 of FIG. 6 will be generated.

Then at a next block 907, the confidence level value specified by a user or provided as a default is retrieved. This is used to filter out some websites based on a legitimacy value or rating that is computed. The search results are further filtered, at a next block 927, based on their legitimacy which depends on their domain name registration in order to be crawled for Internet search operation. Prior to displaying the search results on the map, all the useless and misleading websites and those that add limited value and squatter's sites are filtered from the search results, and then displayed.

At the block 911, the filtering operation requires that the user enter a confidence factor interactively. This factor is compared with the computed correlation factor between the "webpage based contact address" and the "legitimate contact address". If the computed correlation factor is greater than or equal to the confidence level factor those web links will be considered for displaying in the search result list. The search engine retrieves various databases that are required to generate the user requested view in the map pane 809 of FIG. 8. The topography-link assembler module 131 of FIG. 1 assembles all the data sets from different databases viz. GPS, map, and satellite to generate the requested view in the map pane 809. A satellite picture of the earth's surface overlaid on the map gives a more realistic view to the displayed search results. The search engine highlights all the displayed items within the selected search region. The current location of the user will be found or received and physically mapped on the world map, if requested, in accordance one embodiment of the present invention.

Another exemplary method of operation performed by a search engine server to facilitate the search region restricted search operation, in accordance with the present invention, comprises several steps of filtering output unwanted or useless websites, weeding out potential spam websites, etc. The search engine receives the search string and the search category information at a block 903. Subsequently, at a next block 921, it receives the geographic search region information such as the search region dimension and its shape. At a next block 905, it generates the search results by executing the "adaptive search module 143 of FIG. 1 with "physical address versus reverse index lookup database" 115 of FIG. 1 as input. Then the search engine performs the search operation at 905 and generates the search result list. The search results that are obtained at 905 are the "search region restricted search results" 611 as discussed with FIG. 6.

Then, at a next block 909, the user's specification (or a default specification) of a confidence level factor is received. The filtering operation requires that the user enter a confidence level factor interactively at 909. This factor is compared with the computed correlation factor between the "webpage based contact address" and the "legitimate contact address" at a next block 927. If the computed correlation factor is greater than or equal to the confidence level factor those web links will be considered for displaying in the search result list, otherwise filtered at the block 911. The search results at this stage are the "well correlated search list" 715 of FIG. 7, displayed on the client device at 923.

The search engine server retrieves the GPS database 113 and physical (or legitimate contact) address information at the block 913. Next, the search engine sever assembles the GPS database 113 and the physical address from location database 111 of FIG. 1, at the block 915. Subsequently the requested view of display will be assembled by topography-link assembler 131 of FIG. 1 at the block 915. The view of the map display will be modified using the GPS database 113, map database 119, satellite database 121 of FIG. 1, at the next block 925 if the satellite image of the earth's topography is requested by the user.

Figure 10:
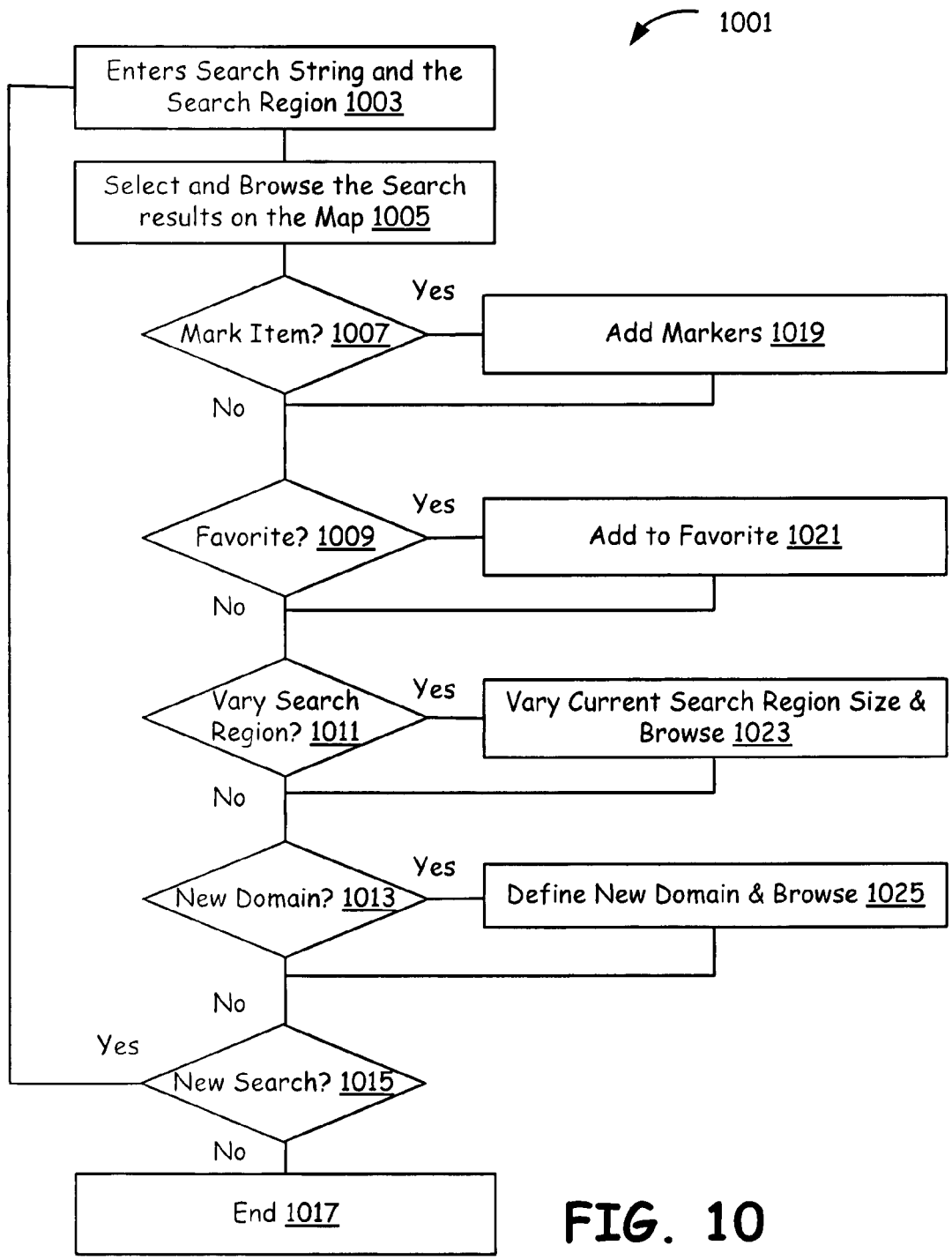
FIG. 10 is flowchart of an exemplary method of operation, performed in conjunction with a user, in using the Whois database based search engine, in accordance the present invention.

FIG. 10 is flowchart of an exemplary method of operation 1001, performed in conjunction with a user, in using the Whois database based search engine, in accordance the present invention. The user typically performs the following sequence of operations using a "search restricted world map based search engine". The search operation starts with the user entering the search string and category, and the search region from the search engine window on the client device. Then the search engine returns the search results from within the search region chosen by the user on the world map. In this process, due to internal reference aggregate Whois database all the crap sites are automatically filtered, as explained earlier with respect to FIGS. 6 and 7 and the method of FIG. 9.

Subsequently, user does the required interaction with the websites indicated on the world map. User tries to know more on the website he has visited, and also add markers to indicate his own landmarks and references on the world map and save them for later references. He can personalize the search settings and current views and save them for later sessions.

The exemplary method starts at the first block 1003 where the user enters a search string. The user's interactions with a search restricted search engine server, for personalizing the search views and the search session setup, is of interest in this method. A user enters the search string and search region or domain at the block 1003 into the search engine. In response to this, the search engine returns the search results and displays them on the world map within a region restricted by the user. User selects the displayed search items and browse at the next block 1005 for more information.

During the browsing operations user can interact with the search engine in number of ways. In accordance with one embodiment, user decides to mark a place on the map at the next block 1007, then if he so desires, he adds a marker at the next block 1019. If the user subsequently wants to add the site on the map into the favorite list he adds this at a next block 1021.

Once the search results are generated, the user can vary the search region or the domain size, and seek if there are any search items of his choice in the newer (bigger or smaller) search dimensions. He may decide to vary the search domain size at the next block 1011, if required he will vary the current search region size at a next block 1023. If the user altogether wants to try a different search region shape from the previous choice, (for e.g. rectangular domain replaced by a circular one), he decides at the next decision block 1013; if he wants to, the user then defines new domain at a next block 1025; else the operation, based on user choice, moves to the next decision block 1015.

At the block 1015, the user may decide on whether he wants to conduct a new search, (probably, by a new search string); if he so desires, the user enters a new search string and new search domain at the next block 1003 again, and repeats the whole sequence of the method of operation. Else, the search ends at the next 1017.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A search engine server that facilitates searching for content on the Internet, the search engine server comprising:
   a computer processor;
   a search criteria that is received from a client communicatively coupled to the search engine server;
   a reverse index database that facilitates identifying a search results based on search criteria received, wherein the search results comprises entries that are documents or references to documents, wherein the entries are each associated with a business or an organization;
   a geographical proximity information computed for a user conducting the search;
   the search engine server restricting the search results to those entries whose associated business or organization is in geographical proximity to the user conducting the search based on the geographical proximity information computed;

an organization contact information supplied by a Whois database server communicatively coupled to the search engine server, wherein the organization contact information provides contact information for the business or the organization associated with one of the entries of the search results;
a contact address correlator module to:
correlate a first contact address retrieved from a Whois database with a second contact address retrieved from a document corresponding to one of the entries in the search results, and
qualify the document for inclusion in presented search results based at least on whether the first contact address is geographically correlated with the second contract address;
a location finder module generating a geographical mapping information mapping the one of the entries with respect to a current location of the user on a map; and
the search engine server communicating the search results with the geographical mapping information to the client.

2. The search engine server of claim 1 wherein the organization contact information comprises at least one of a city name, a state name, a country code, a telephone number and a GPS location.

3. The search engine server of claim 1 wherein the organization contact information comprises ownership information for the corresponding domain associated with the one of the entries, the search engine server further comprising:
the search engine server determining a total number of domains registered by the organization with the same or similar ownership information;
the search engine server assigning a priority to the corresponding one of the entries of the search result if the total number of domains is determined to be over a threshold number; and
the search engine server employing the priority to determine the inclusion of the one of the entries into the search results.

4. The search engine server of claim 1 further comprising:
organization contact information, wherein the organization contact information provides contact information for the business or the organization associated with one of the entries of the search results;
a Whois crawler module that assembles an aggregate Whois database from a Whois information retrieved from a plurality of Whois databases;
the Whois crawler module crawling through the plurality of Whois databases to retrieve the Whois information and populating the Whois database using the Whois information;
the search engine server retrieving the organization contact information from the Whois database; and the search engine server employing the organization contact information to determine whether to include the one of the entries into the search result.

5. The search engine server of claim 4 further comprising:
an adaptive search module to perform searching;
the search criteria received by the search engine server from the client comprising a search string and a search region;
the search engine server determining a search category information and a search region restriction for the user based on the search criteria; and
the adaptive search module generating the search results based on the search criteria, the search category information, and the search region restriction.

6. A method performed by a search engine server communicatively coupled to a client device, the method comprising:
receiving, by the search engine server from the client device, search criteria comprising at least one of a search string, a search category, and a search region, the search string comprising a plurality of words;
assembling a preliminary search results factoring in the search region and at least one of the search string and search category, assembling comprising:
looking up a reverse index database, communicatively coupled to or associated with the search engine server, for the occurrence of the plurality of words in target documents and creating a target search results, and factoring in at least the search category and the search region into the target search results to create the preliminary search results;
comparing a webpage contact address associated with at least one webpage referenced in the preliminary search results with a corresponding organizational contact address retrieved from a Whois database, thereby creating a correlation data indicating whether the webpage contract address is geographically correlated to the organizational contact address;
generating a correlated search result incorporating the correlation data; and communicating at least a subset of the correlated search result to the client for display to a user.

7. The method of claim 6 wherein generating further comprising:
retrieving a user provided confidence level factor; and incorporating the confidence level factor in generating the correlated search result.

8. The method of claim 7 wherein the preliminary search results comprises a plurality of targets and wherein the incorporating comprises:
comparing the correlation data to the confidence level factor; and determining if each of the plurality of targets in the preliminary search results compares favorably in order to incorporate it into the correlated search result.

9. The method of claim 6, wherein correlating comprises:
computing a correlation value for each of the plurality of entries of the preliminary search results; and comparing the correlation value for each of the plurality of entries with a user provided confidence level factor; and
flagging the each of the plurality of entries for inclusion into the correlated search result only if the corresponding correlation value is greater than the confidence level factor.

10. The method of claim 9 wherein the computing and comparing is conducted during the assembling of the preliminary search results.

11. A search engine infrastructure for Internet based searches, the search engine infrastructure comprising:
a computer processor;
a search engine;
a Whois repository;
the search engine capable of employing a reverse index database to assemble a search result based on a user provided search criteria;
a Whois crawler capable of crawling through a plurality of Whois databases and servers and retrieving Whois information that it deposits into the Whois repository, the Whois information including organizational contact addresses associated with respective Whois records associated with respective businesses;

a web crawler that crawls to Internet websites and collects webpage information, the webpage information including webpage contact addresses associated with the respective businesses;

the web crawler updating the reverse index database with the collected webpage information;

the search engine employing the Whois repository along with the reverse index database to assemble a search region constrained search result, the search result excluding webpages associated with businesses having an organizational contact address and a webpage contact address that are geographically uncorrelated;

the search engine communicating the search region constrained search result to a client network browser on a client device with which it is communicatively couple;

the Whois crawler retrieving a plurality of business registration information from the plurality of Whois databases and servers that each manage a plurality of registration information for businesses and organizations that conduct business on the Internet;

the search engine infrastructure managing the Whois repository by adding and deleting, as necessary, the plurality of business registration information retrieved by the Whois crawler; and the search engine providing the search region constrained search result along with a mapping information to the client network browser on a client device to facilitate a map based search result display.

12. The search engine infrastructure from claim 11 wherein the reverse index database selectively maintains a reference to an associated one of the plurality of business registration information or to a subset thereof.

13. The search engine infrastructure from claim 11 wherein the search region constrained search result comprises a plurality of entries and wherein the search engine enhances the search region constrained search result with information necessary to display at least one of the plurality of entries on a map.

* * * * *